United States Patent
Pagano

(12) 
(10) Patent No.: US 10,766,510 B1
(45) Date of Patent: Sep. 8, 2020

(54) METHOD AND APPARATUS FOR DETECTING DEFECTS LOCATED IN THE HEAD AREA OF RAIL

(71) Applicant: Dominick A. Pagano, Naples, FL (US)

(72) Inventor: Dominick A. Pagano, Naples, FL (US)

(*) Notice: Subject to any disclaimer, the term of this patent is extended or adjusted under 35 U.S.C. 154(b) by 90 days.

(21) Appl. No.: 15/896,598

(22) Filed: Feb. 14, 2018

Related U.S. Application Data

(60) Provisional application No. 62/458,748, filed on Feb. 14, 2017.

(51) Int. Cl.
| | | |
|---|---|---|
| *G01N 29/04* | (2006.01) | |
| *G01N 29/22* | (2006.01) | |
| *G01N 29/24* | (2006.01) | |
| *G01N 29/265* | (2006.01) | |
| *B61K 9/10* | (2006.01) | |

(52) U.S. Cl.
CPC ............ *B61K 9/10* (2013.01); *G01N 29/043* (2013.01); *G01N 29/225* (2013.01); *G01N 29/2493* (2013.01); *G01N 29/265* (2013.01); *G01N 2291/044* (2013.01); *G01N 2291/2623* (2013.01)

(58) Field of Classification Search
CPC ..... B61K 9/10; G01N 29/2493; G01N 29/225
USPC ........................................................ 73/599
See application file for complete search history.

(56) References Cited

U.S. PATENT DOCUMENTS

| | | | | |
|---|---|---|---|---|
| 3,531,977 A | * | 10/1970 | Chaskelis | G01N 29/30 73/1.82 |
| 4,658,649 A | * | 4/1987 | Brook | G01N 29/0618 73/598 |
| 6,516,668 B2 | | 2/2003 | Havira et al. | |
| 6,604,421 B1 | * | 8/2003 | Li | G01N 29/2493 73/636 |
| 7,654,143 B2 | * | 2/2010 | Roney | F01D 25/285 73/620 |
| 9,010,186 B2 | | 4/2015 | Pagano | |

* cited by examiner

*Primary Examiner* — Jacques M Saint Surin
(74) *Attorney, Agent, or Firm* — Kevin D. Nowak; Carter Ledyard & Milburn, LLP

(57) ABSTRACT

A system for performing ultrasonic inspection of a rail including a sensing wheel arranged to roll along the top of the rail, and a plurality of ultrasonic transducers in the sensing wheel. The sensing wheel is aligned perpendicular to a vertical plane extending from the rail, detecting horizontal defects in a head area of the rail. The ultrasonic rail inspection system is designed to detect and classify horizontal defects in the head of the rail which will propagate in the longitudinal direction that will eventually result in defects component that will propagate in the transverse plane of the rail head area. The capability of detecting and classification of this type of defect will enable compliance to the FRA subpart 213.113 Defective rails specification, that is currently not being met by the existing technology.

7 Claims, 5 Drawing Sheets

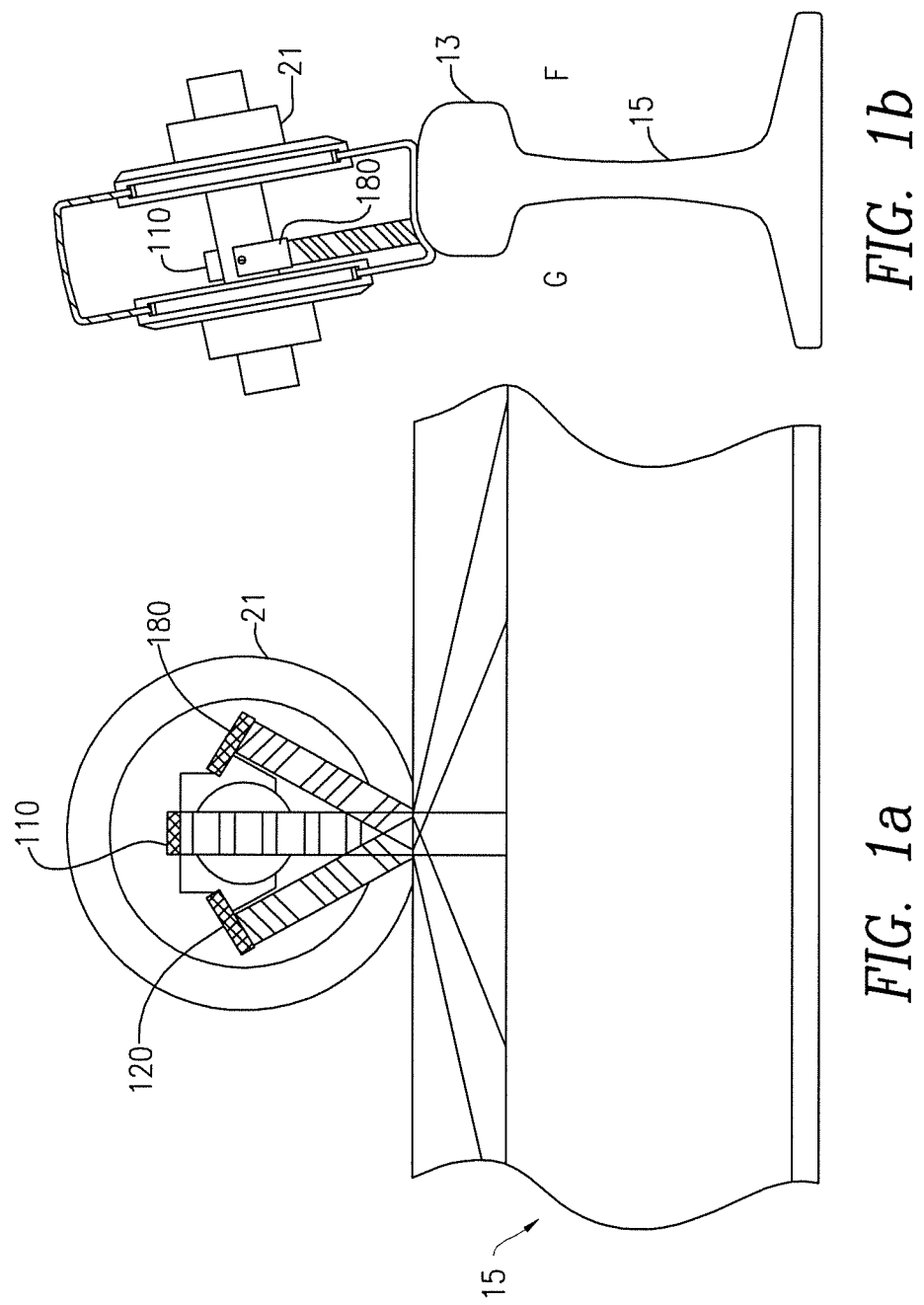

METHOD AND APPARATUS FOR DETECTING DEFECTS LOCATED IN THE HEAD AREA OF RAIL

This application claims priority to U.S. Provisional Patent Application No. 62/458,748 filed Feb. 14, 2016 entitled "METHOD AND APPARATUS FOR DETECTING DEFECTS LOCATED IN THE HEAD AREA OF RAIL" and is hereby incorporated by reference in its entirety.

U.S. Pat. No. 9,010,186 ('186 patent) is related to this application, and is hereby incorporated by reference in its entirety.

The present invention relates to a method and apparatus for the ultrasonic inspection of test material, more specifically, the ultrasonic inspection of horizontal defects and fractures located in the head area of a rail. These horizontal defects in the railhead area, are precursors to the initiation of transverse component of detail fractures that may be caused by metal fatigue.

BACKGROUND OF THE INVENTION

The teaching in U.S. Pat. No. 9,010,186 improved the detection of detailed transverse fractures over the then existing state of the art. The feature of the invention provides beams (one 0 degree and two 70 degree transducers) tilted from the perpendicular in an amount sufficient to detect detailed fractures which result from longitudinal cracks that propagate in the horizontal plane of the rail.

This feature of the prior art therefore uses both the horizontal and transverse signs of such defects and renders a more robust system, minimizing false alarms due to the 70-degree indication from anomalies such as head checking, surface engine burns and other surface conditions.

The detection of a horizontal component of the detail fracture is only used as defect confirmation in the presence of a transverse component indication from at least one of the 70-degree transducers. The problem of detecting detailed transverse fractures that are in the shadow or masked by the horizontal defects (split head) still exists. This undetected transverse defect component is the predominant cause of service failures and derailments. Currently several detection methods are being introduced to eliminate the horizontal masking affects, some methods include the use single aperture beams reflected off the filet area at the bottom of the rail head upward across and/or toward the top of the rail surface, guided waves, and phased arrays, All have shown limited results and costly to deploy.

SUMMARY OF THE INVENTION

It is an object of the present invention to provide more effective and complementary non-destructive testing (NDT) technologies to detect and classify horizontal split head defects, that are the precursors of all detailed transverse fractures. This detection and classification will allow the railways owners to proactively implement a preventive maintenance program to eliminate the root cause of the transverse detail fractures.

It is therefore an object of the present invention to provide a commercially viable detection system able to detect and size the horizontal head defect and allow the Railway owners to comply with the FRA Horizontal Split Head Regulations (213.113 Defective rails) that are currently not being met by the existing technology.

The present invention is directed to a system for performing ultrasonic inspection of a rail and detecting horizontal fractures in the head of the rail which propagate in the horizontal and longitudinal plane of the rail. Horizontal split head defects are a horizontal progressive defect originating inside of the rail head and are typically ¼ inch or more below the running surface and progress horizontally in all directions. Such defects generally are initiated in the gauge and field side of the rail head, an area currently not being inspected. These go unreported unless they are large enough to propagate over the web area and interrupt the zero-degree transducer. The present invention advantageously directs the ultrasonic beams across the head and perpendicular to the surface of the rail to detect and classify such horizontal cracks.

It is a feature of the invention that the ultrasonic beams are sequentially cycled such as a linear or phased array or single element transducers that are serially or parallel processed across and in the horizontal plane of the rail. This allows the system to determine the defect depth and width across the head area, while the incremental longitudinal movement along the railway track defines the length.

While linear arrays have been used in rail inspection as illustrated in U.S. Pat. No. 6,516,668, they were used as a means of aligning a rail testing device with respect to the rail using the conventional transducers in the center of the rail web area. The array disclosed has not been used to detect or define horizontal defects.

Currently all the rail inspection services and equipment used in the industry do not comply with the FRA Horizontal Split Head detection. They cannot detect Horizontal Split Head defects unless they are located over the web area.

Another major feature of the present invention is that it meets the FRA mandates that rail inspection equipment be capable of detecting and determining the length of any Horizontal Split Head (HSH) anywhere in the head area. This is defined in the FRA Regulations 213.113 Defective rails and further mandates the following remedial action: For a Horizontal Split Head defect that is 1" to 2" long: inspect rail 90 days after it is determined to continue the track in use and limit operating speed over defective rail to 50 mph or the maximum allowable speed under 213.9 for the class of track concerned, whichever is lower. For a Horizontal Split Head defect that is 2" to 4" long: inspect rail 30 days after it is determined to continue the track in use and limit operating speed over defective rail to 30 mph or the maximum allowable speed under 213.9 for the class of track concerned, whichever is lower. For a Horizontal Split Head defect that is 4" or longer: limit operating speed over defective rail to that as authorized by a person designated under 213.7(a), who has at least one year of supervisory experience in railroad track maintenance. The operating speed cannot be over 30 mph or the maximum allowable speed under 213.9 for the class of track concerned, whichever is lower.

BRIEF DESCRIPTION OF THE DRAWINGS

Further objects, features and advantages of the invention will become apparent from the following detailed description taken in conjunction with the accompanying figures showing illustrative embodiments of the invention, in which:

FIGS. 1a and 1b illustrate an ultrasonic rail detection system according to the prior art, U.S. Pat. No. 9,010,186;

DETAILED DESCRIPTION OF THE INVENTION

Figure 2A:
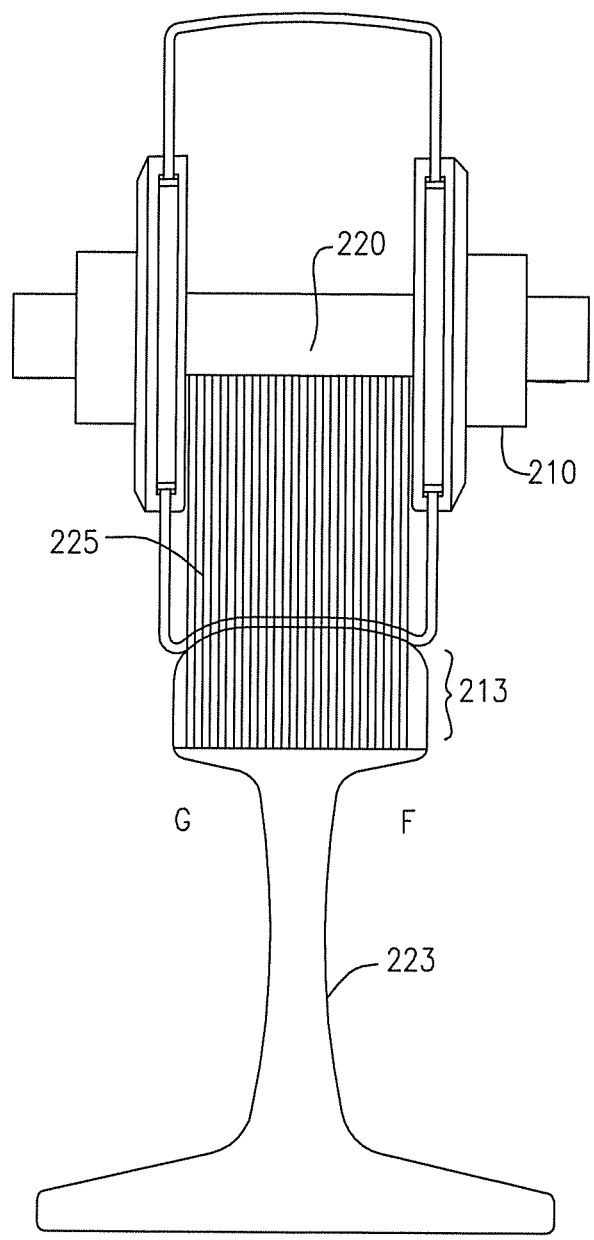
FIGS. 2a and 2b illustrate an ultrasonic rail detection system according to the present invention.

FIGS. 1a and 1b illustrate an ultrasonic rail detection system according to U.S. Pat. No. 9,010,186. FIG. 1a shows wheel 21 on rail 15. FIG. 1b shows an alternate perspective of wheel 21 on rail head 13 on rail 15. In the embodiment, in accordance with its teachings, the single wheel 21 has at least one zero-degree transducer 110 and at least two 70 degree transducers 120, 180. The zero degree transducer 110 is primarily used to verify the angular position of the wheel once tilted to the 8-10 degrees. The two forward looking and backward looking transducers, 120, 180, respectively, are used for flaw detection for a transverse defect. The prior art provides a means for the wheel to be angled and set at a fixed angle in such a way as to have the transducer essentially perpendicular to the surface of rails gage corner G. This detection means requires a positive response from both zero degree transducer 110 and transverse transducers 120, 180, to classify it as a defect. A defect will not be reported unless both the zero degree transducer 110 detects a horizontal defect and the two 70 degree transducers 120, 180 alarm an actual defect. If a 70 degree transducer 120, 180, does not alarm a defect, no anomaly will be reported. This invention also limits the inspection to approximately 0.75 inches on the gage side, G, of rail head 13.

The present invention provides an apparatus for performing ultrasonic inspection of a length of test material, such as a railroad rail, with ultrasonic transducing means emitting a beam of ultrasonic energy from within sealed wheel means and arranged for rolling contact along the test material. The apparatus includes a sensing wheel arranged for rolling contact along the length of the rail and at least one ultrasonic transducer included in the sensing wheel. The ultrasonic transducers are aimed downwardly perpendicular to the top surface of the rail. The present invention provides an independent single sensing wheel and does not require any additional training or leading wheels, however the present invention can be incorporated into existing systems that use leading and trailing wheels. A data processing unit may be used to generate the cross sectional area of a horizontal defect using the information gathered via the sensing wheel.

Figure 2B:
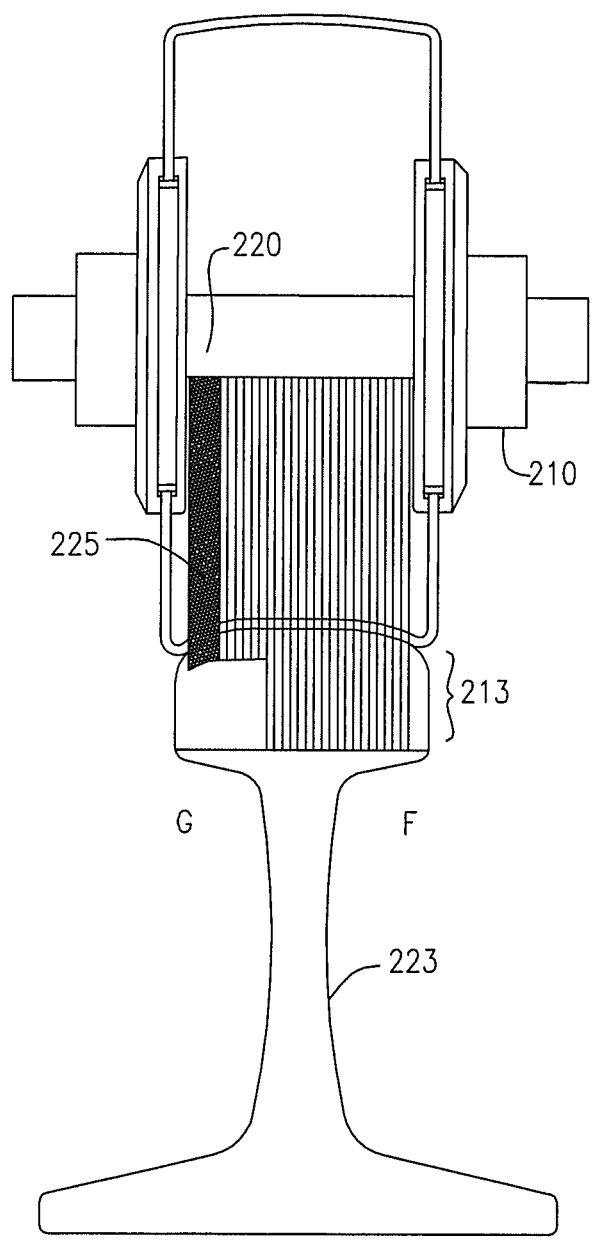

For the present invention, FIGS. 2a and 2b illustrate a system for ultrasonic railhead inspection including wheel 210 perpendicular (its axis) to railroad rail 223 and containing a linear array transducer 220 parallel to the surface of rail head 213. The linear array 220 includes multiple adjacent transducers 225 that electronically scan across head 213 of rail 223 yielding depth and width information. It does not limit the detection capabilities to gage corner G but allows for the detection of defects located across the entire head of the rail. The linear array may be a sequentially activated linear array, a phased array, a discreet array or a combination of arrays, for example. The multiple transducer elements are contained in a single housing within wheel 210. The number of transducers can vary from 1 to n but typically range from 8 to 64 transducers. All of the transducers are housed and processed in a single housing within the same wheel. The transducer elements are generally 1 to 1.5 mm wide by 12 mm long. FIG. 2b illustrates a zero degree transducer linear array 220 comprising multiple small transducers elements 225. The transducers are activate in scan direction S. The present invention allows the beams of the transducers to be electronically moved across the head of the rail to yield boundary (width) of the defect. The wheel movement along the rail is used to yield boundary (length) of the defect. The time of flight at each point will determine the depth of the defect. This provides cross section mapping of the defect.

In a sequentially activated linear array, for example, many small transducers may be placed next to each other. They are then activated as a group to widen the beam and produce a longer near field distance. The initial transducer is then inactivated and the next transducer activated, moving the beam along. In this way many more wide beams can be produced in a smaller space than could be produced with wide transducers activated individually.

Figure 3:
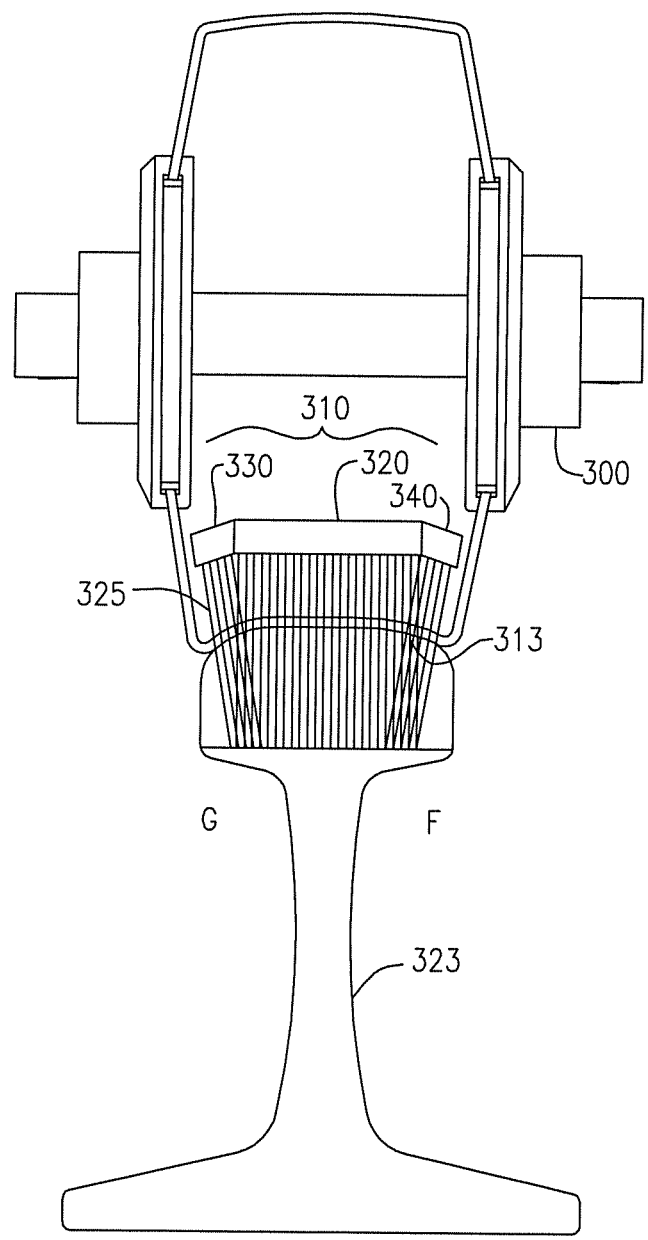
FIG. 3 illustrates an alternate ultrasonic rail detection system configuration according to the present invention.

FIG. 3 illustrates an alternate embodiment within wheel 300 with linear array transducer 310 shown in three sections 320, 330, 340. Linear array 310 consists of multiple zero degree transducers 325 positioned parallel to the surface of rail head 313. Section 320 of the linear array is flanked by linear array sections 330 and 340 which are angled to be perpendicular to the gage G and field F side of the rail head 313 on rail 323. Sections 330 and 340 of linear array transducer 310 are positioned to be parallel to the curved surface of the rail head. The angle between sections 330, 340 and 320 may vary, but is typically 8 to 12 degrees.

Figure 4:
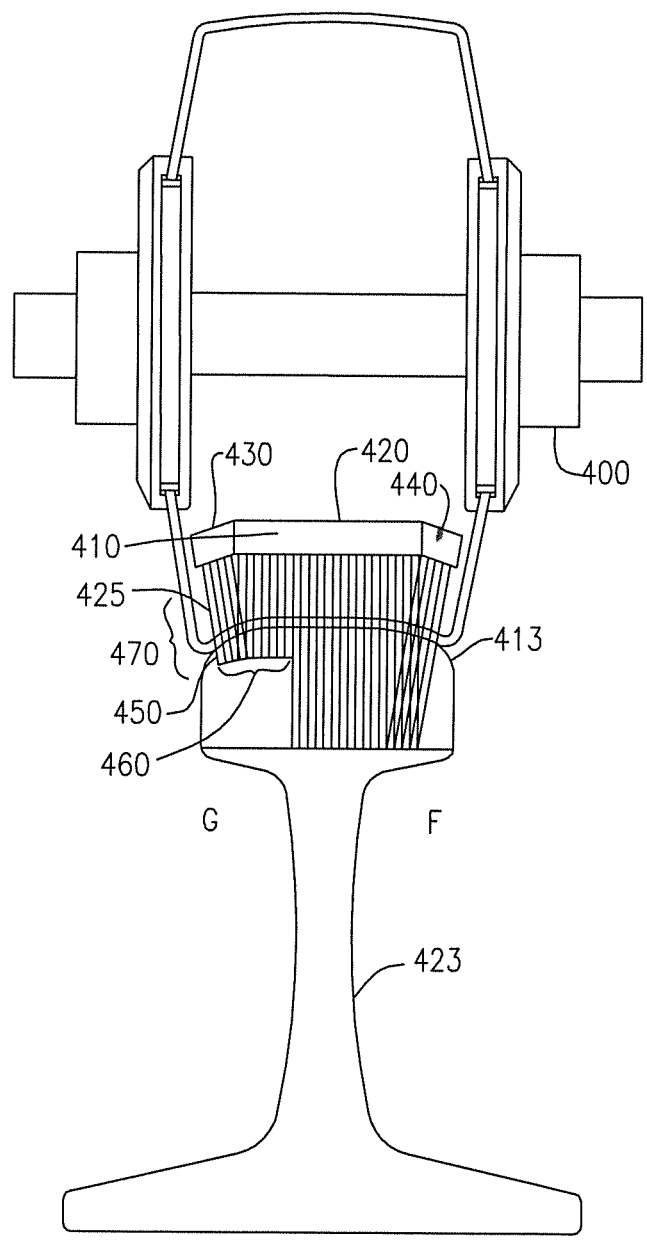
FIG. 4 illustrates horizontal defects which can be detected with the present invention; and the use of the inventive system for detecting and sizing the depth and width of a horizontal defect.

FIG. 4 illustrates horizontal defects 450 which can be detected with the present invention using the linear array transducer 410, shown having sections 420, 430, 440, on wheel 400. FIG. 4 further illustrates use of the inventive system for detecting and sizing depth and width of horizontal defect across the entire head area 413 of rail 423 by electronically moving the transducer array across the head of the rail to yield the boundary 460 (width) of the defect and determining the depth 470 of the defect by the time of flight at each point.

The teaching of the present invention with respect to a single (or sensing) wheel on the rail is shown using an end schematic section using only zero degree transducers and does not require tilting as in U.S. Pat. No. 9,010,186 of the zero degree and 70 degree transducers.

Although a specific embodiment of the invention has been disclosed herein it is to be understood that various modifications can be made to the described embodiment without departing from the scope of the claimed invention, which modification, would be apparent to one skilled in this art area.

The invention claimed is:

1. A system for performing an ultrasonic inspection of railroad rails in order to detect horizontal fractures in a head area of a rail being inspected, which horizontal fractures propagate in a horizontal and longitudinal plane of said rail, said inspection being performed as said inspection system moves along the railroad rails, the system comprising:
   an independent single sensing wheel arranged to roll along the top of the railroad rails being inspected, and
   a plurality of ultrasonic transducers in said sensing wheel, wherein said sensing wheel is continuously aligned perpendicular to a vertical plane extending from the railroad rails in order for the sensing wheel to detect and size a depth and width of a horizontal defect in said head area of said rail.

2. A system in accordance with claim 1 wherein said plurality of ultrasonic transducers are a linear array scanning across said head area of said rail.

3. A system in accordance with claim 1 wherein said plurality of ultrasonic transducers are a phased array scanning across said head area of said rail.

4. A system in accordance with claim 1 wherein said plurality of ultrasonic transducers are a discreet array scanning across said head area of said rail.

5. A system for performing an ultrasonic inspection of railroad rails in order to detect horizontal fractures in a head area of a rail being inspected, which horizontal fractures propagate in a horizontal and longitudinal plane of said rail, said inspection being performed as the inspection system moves along the railroad rails, the system comprising,

- at least one sensing wheel per rail arranged to roll along the top of each rail,
- a plurality of ultrasonic transducers in each sensing wheel, with each sensing wheel being continuously aligned perpendicular to a vertical plane extending from the railroad rails as the inspection system moves along the railroad rails, each railroad rail having a head area with a specific width,
- each ultrasonic transducer, in each sensing wheel, directing an ultrasonic beam into said rail, said ultrasonic beam being spatially positioned across said width of said head area of each rail being inspected, and
- said plurality of ultrasonic transducers detecting and sizing a depth and a width of a detected horizontal defect across said head area of said rail.

6. A system in accordance with claim 5 wherein said plurality of transducers detect and size said horizontal defects that exist on a field side of said head area of said rail.

7. A system in accordance with claim 5 wherein said plurality of transducers detect and size said horizontal defects that exist on a gauge side of said rail.

* * * * *

UNITED STATES PATENT AND TRADEMARK OFFICE
CERTIFICATE OF CORRECTION

Page 1 of 1

PATENT NO. : 10,766,510 B1
APPLICATION NO. : 15/896598
DATED : September 8, 2020
INVENTOR(S) : Dominick A. Pagano It is certified that error appears in the above-identified patent and that said Letters Patent is hereby corrected as shown below:

On the Title Page

Item (74) Please correct attorney name to Keith D. Nowak, Carter Ledyard & Milburn, LLP Signed and Sealed this
Twentieth Day of October, 2020

Andrei Iancu
*Director of the United States Patent and Trademark Office*